(12) United States Patent
Waring

(10) Patent No.: US 11,007,544 B2
(45) Date of Patent: May 18, 2021

(54) UNDERCARRIAGE WASHING ASSEMBLY

(71) Applicant: Peter Waring, Harpursville, NY (US)

(72) Inventor: Peter Waring, Harpursville, NY (US)

( * ) Notice: Subject to any disclaimer, the term of this patent is extended or adjusted under 35 U.S.C. 154(b) by 149 days.

(21) Appl. No.: 16/392,212

(22) Filed: Apr. 23, 2019

(65) Prior Publication Data

US 2020/0338575 A1 Oct. 29, 2020

(51) Int. Cl.
*B05B 1/20* (2006.01)
*B60S 3/04* (2006.01)
*B08B 3/02* (2006.01)
*B05B 9/01* (2006.01)

(52) U.S. Cl.
CPC ............... *B05B 1/20* (2013.01); *B05B 9/01* (2013.01); *B60S 3/044* (2013.01); *B08B 3/026* (2013.01)

(58) Field of Classification Search
CPC . B05B 1/20; B05B 12/16; B05B 15/16; B60S 3/04; B60S 3/042; B60S 3/044; B08B 3/02; B08B 3/024; B08B 3/026
USPC .................................................. 239/722, 754
See application file for complete search history.

(56) References Cited

U.S. PATENT DOCUMENTS

| 4,580,726 | A | | 4/1986 | Unger |
| 4,984,746 | A | * | 1/1991 | Joyal ....................... B60S 3/042 134/123 |
| D321,574 | S | * | 11/1991 | Shevers, Jr. ................... D32/15 |
| 5,707,014 | A | * | 1/1998 | Chan ......................... B08B 3/02 239/588 |
| 6,079,640 | A | | 6/2000 | Merritts |
| 6,131,831 | A | * | 10/2000 | Lawrence ............... B60S 3/044 134/123 |
| 6,776,363 | B1 | | 8/2004 | Falletta |
| 7,208,051 | B2 | * | 4/2007 | Zinski ..................... B08B 3/024 134/34 |
| 7,896,266 | B1 | | 3/2011 | Cooper |
| 8,973,849 | B1 | | 3/2015 | Connelly |
| 9,533,320 | B1 | | 1/2017 | Koshnick |
| 2006/0219810 | A1 | * | 10/2006 | Saade ..................... B60S 3/042 239/159 |
| 2007/0007371 | A1 | * | 1/2007 | Mutz ....................... B60S 3/044 239/754 |
| 2015/0014450 | A1 | * | 1/2015 | Suden ..................... B05B 9/007 239/722 |
| 2017/0297539 | A1 | * | 10/2017 | Hills ....................... B08B 3/026 |

* cited by examiner

*Primary Examiner* — Darren W Gorman

(57) ABSTRACT

An undercarriage washing assembly for washing the undercarriage of a vehicle includes a spray block 12 that has a fluid input 14, a first fluid output 16 and a second fluid output 18. The fluid input 14 is fluidly coupled to a fluid source 20 comprising a handle of a pressure washer. The first fluid output 16 is oriented to lie along a line oriented at an upward angle with respect to the fluid input 14. In this way the first fluid output 16 can spray fluid upwardly from the spray block 12. The second fluid input 14 is oriented to lie along a line is oriented at an upward angle with respect to the fluid input 14 to spray fluid upwardly from the spray block 12.

6 Claims, 5 Drawing Sheets

UNDERCARRIAGE WASHING ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

REARGROUND OF THE INVENTION (1) Field of the Invention (2) Description of Related Art Including Information Disclosed Under 37 CFR 1.97 and 1.98

The disclosure and prior art relates to washing devices and more particularly pertains to a new washing device for washing the undercarriage of a vehicle.

BRIEF SUMMARY OF THE INVENTION

An embodiment of the disclosure meets the needs presented above by generally comprising There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
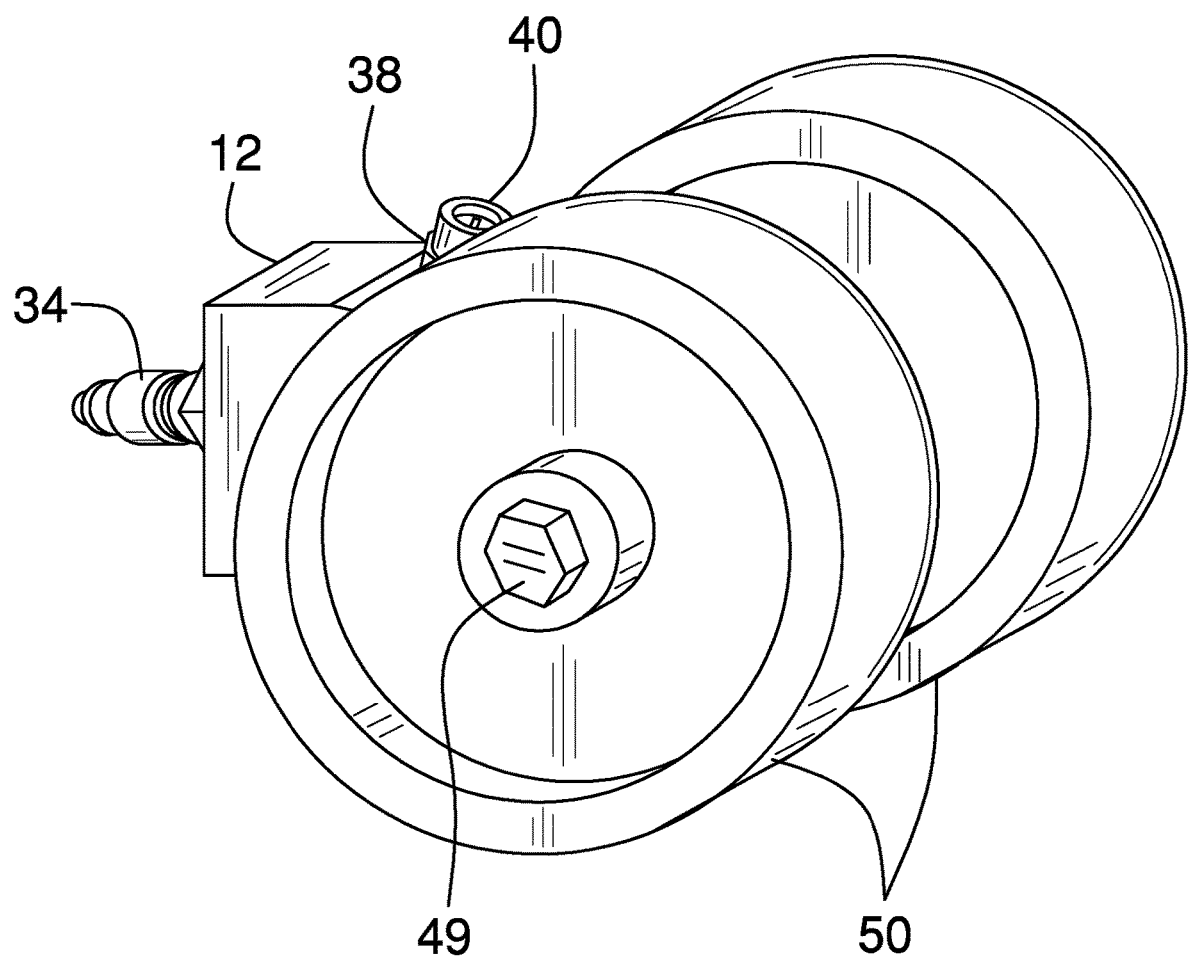
FIG. 1 is a perspective view of an undercarriage washing assembly according to an embodiment of the disclosure.
Figure 2:
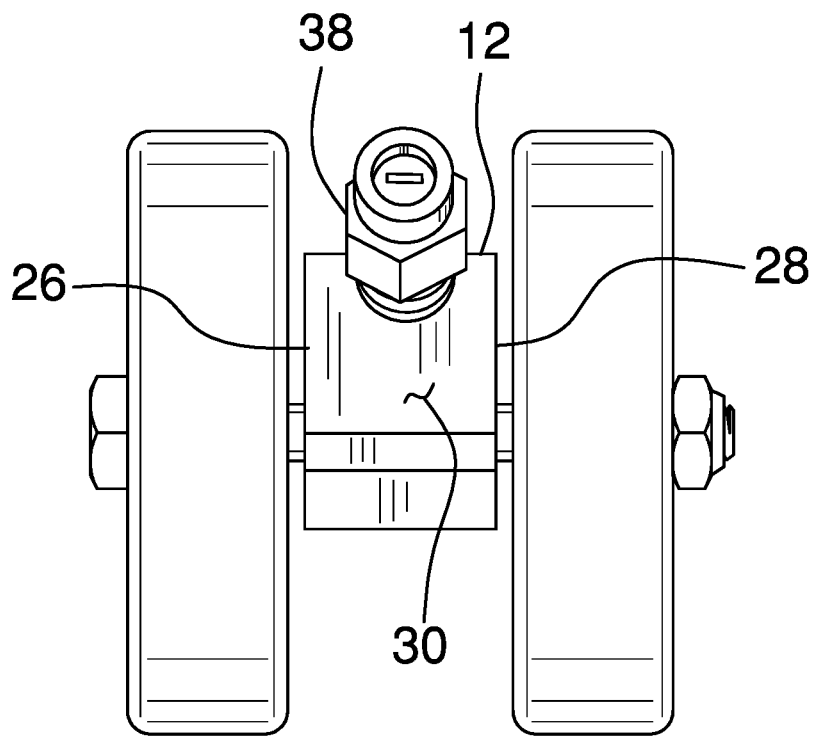
FIG. 2 is a front view of an embodiment of the disclosure.
Figure 3:
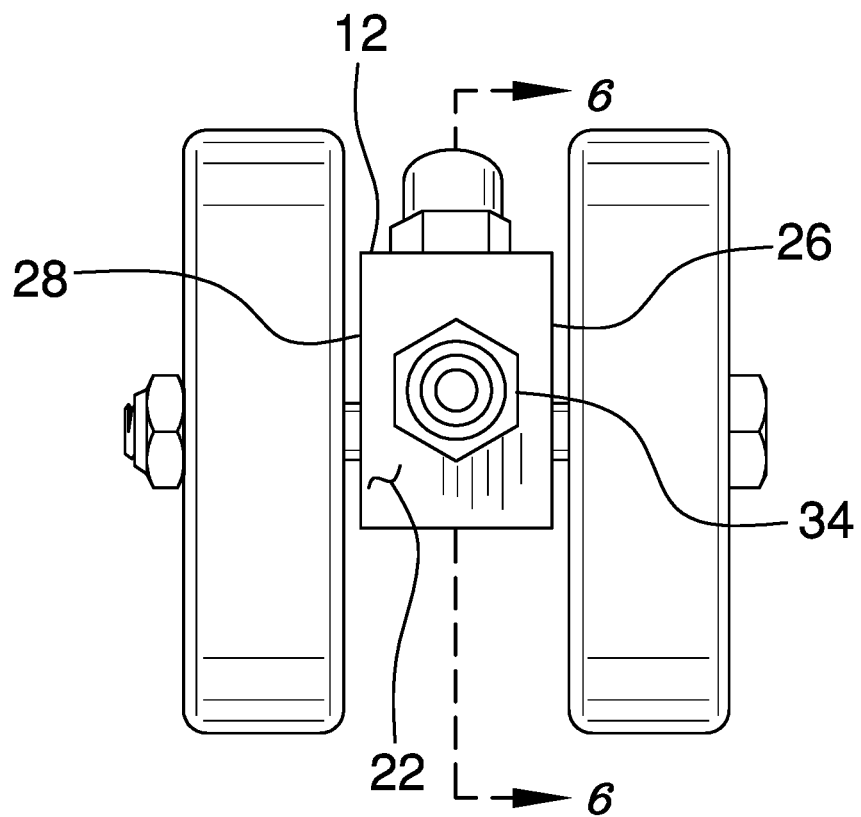
FIG. 3 is a back view of an embodiment of the disclosure.
Figure 4:
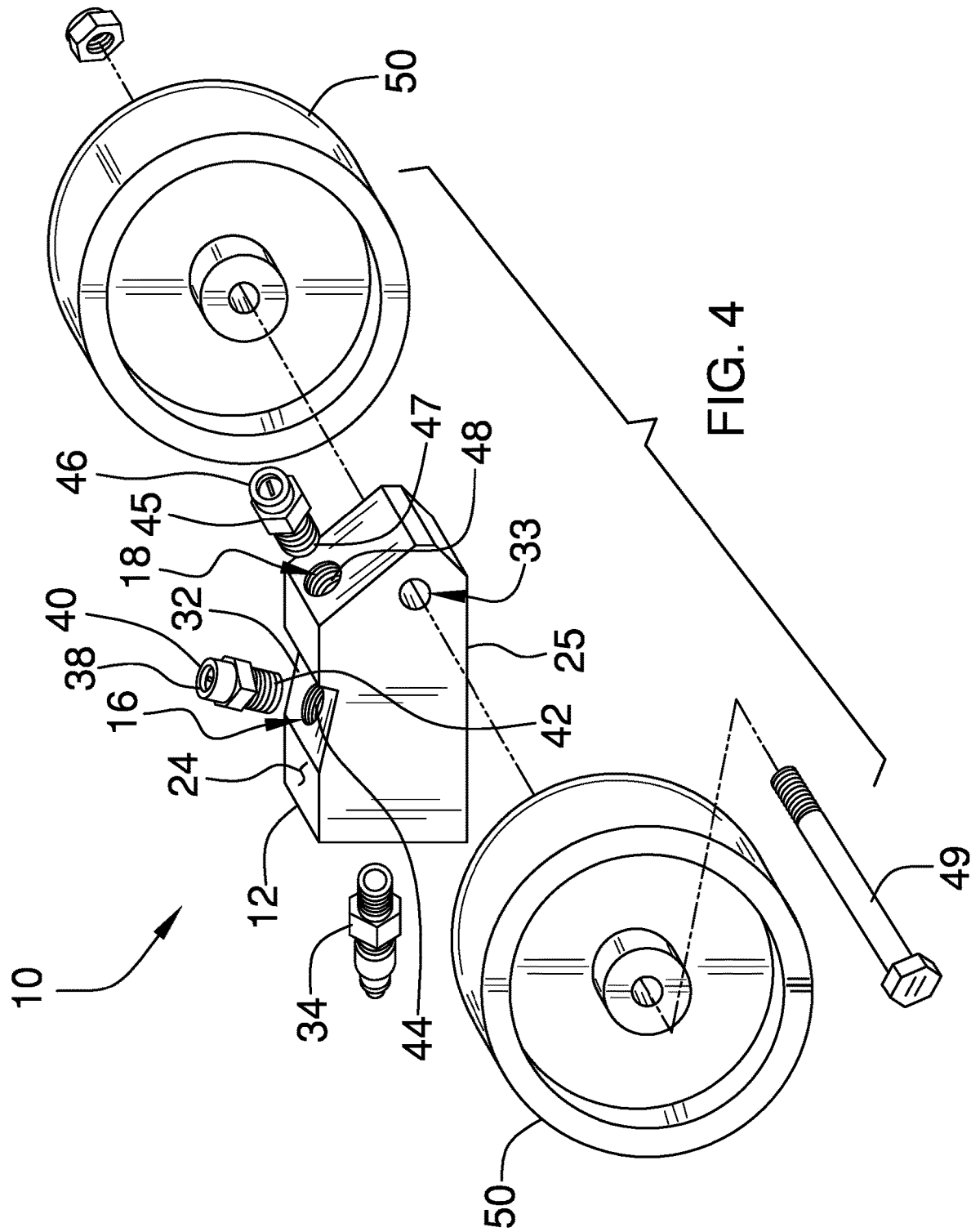
FIG. 4 is an exploded perspective view of an embodiment of the disclosure.
Figure 5:
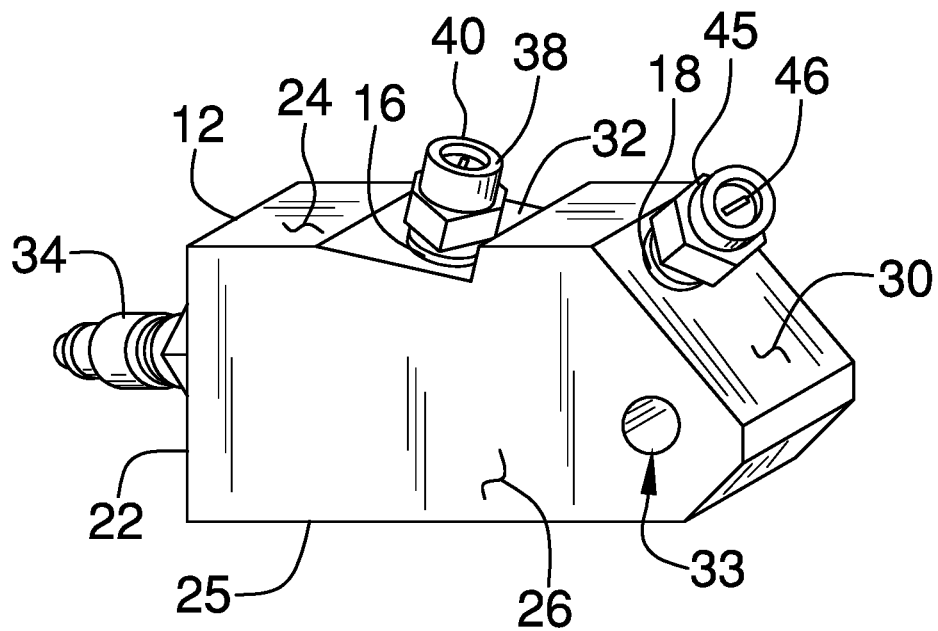
FIG. 5 is a perspective view of a spray block of an embodiment of the disclosure.
Figure 6:
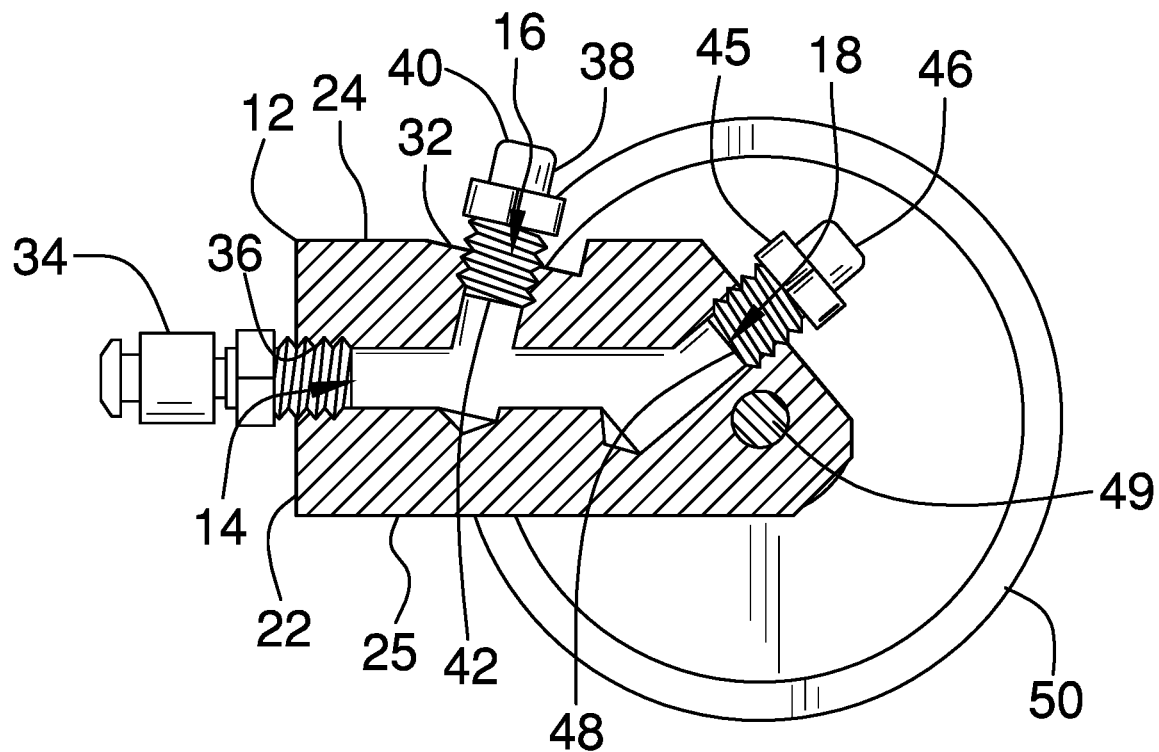
FIG. 6 is a cross sectional view taken along line 6-6 of FIG. 3 of an embodiment of the disclosure.
Figure 7:
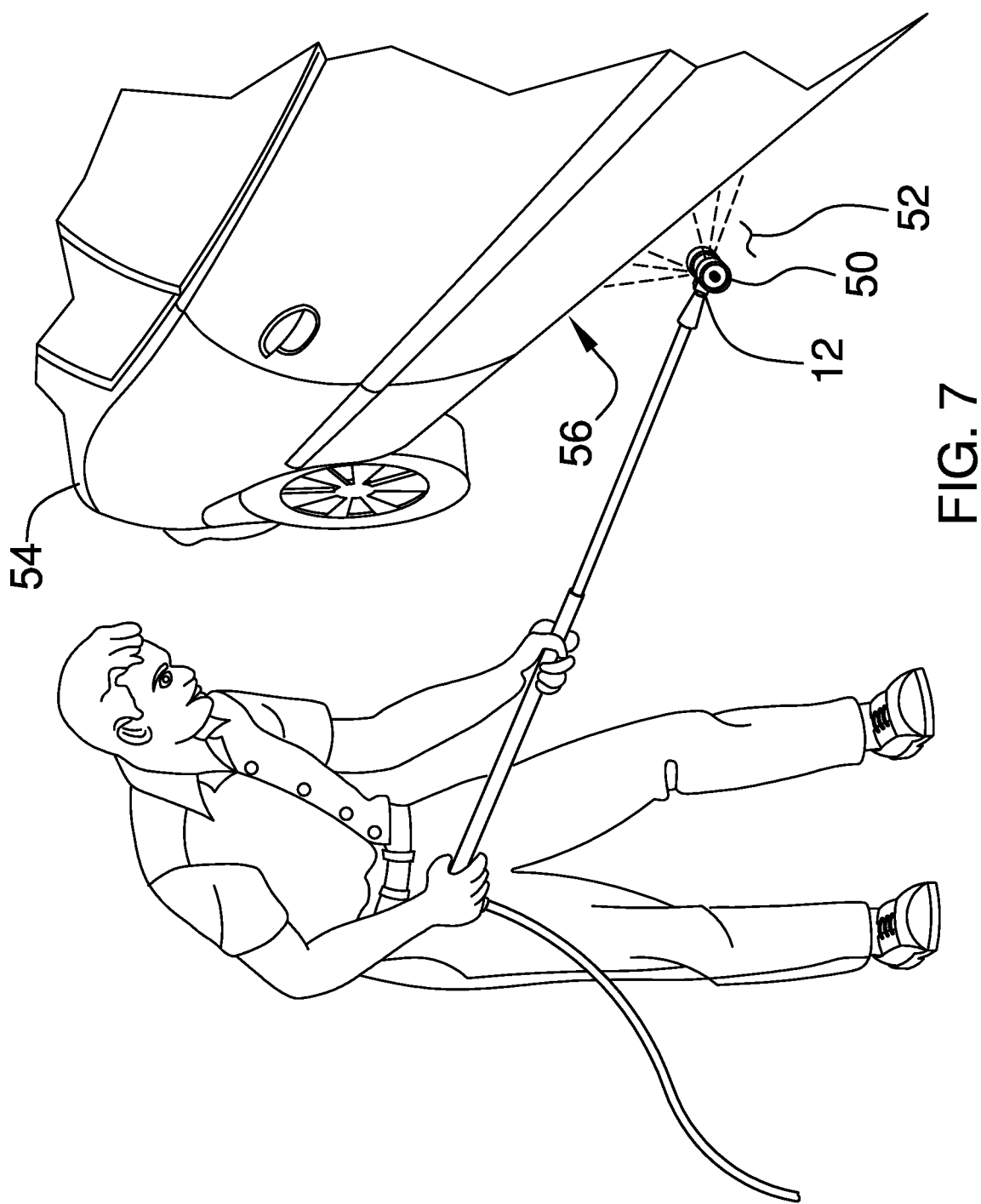
FIG. 7 is a perspective in-use view of an embodiment of the disclosure.

With reference now to the drawings, and in particular to FIGS. 1 through 7 thereof, a new washing device embodying the principles and concepts of an embodiment of the disclosure and generally designated by the reference numeral 10 will be described.

As best illustrated in FIGS. 1 through 7, the undercarriage washing assembly 10 generally comprises a spray block 12 that has a fluid input 14, a first fluid output 16 and a second fluid output 18. The fluid input 14 is fluidly coupled to a fluid source 20 comprising a handle of a pressure washer. The first fluid output 16 is oriented to lie along a line oriented at an upward angle with respect to the fluid input 14. In this way the first fluid output 16 can spray fluid upwardly from the spray block 12. The second fluid input 14 is oriented to lie along a line is oriented at an upward angle with respect to the fluid input 14 to spray fluid upwardly from the spray block 12.

The spray block 12 has a rear surface 22, a top surface 24, a bottom surface 25, a first lateral surface 26, a second lateral surface 28 and a front surface 30. The top surface 24 has a first angled section 32 angling downwardly toward the bottom surface 25 and the front surface 30 is oriented at an angle between the top 24 and bottom 25 surfaces. The spray block 12 may have a length of approximately 3.0 inches, a height of approximately 1.5 inches and a width of approximately 1.0 inches.

The fluid input 14 extends through the rear surface 22 toward the front surface 30. The first fluid output 16 extends through the first angled section 32 of the top surface 24 and intersects the fluid input 14 such that the first fluid output 16 is in fluid communication with the fluid input 14. The second fluid output 18 extends through the front surface 30 and intersects the fluid input 14 such that the second fluid output 18 is in fluid communication with the fluid input 14. Additionally, the spray block 12 has an axle aperture 33 extending through each of the first 26 and second 28 lateral surfaces of the spray block 12, and the axle aperture 33 is positioned closer to the front surface 30 than the rear surface 22.

An input nozzle 34 is removably coupled to the spray block 12 and the input nozzle 34 is can be fluidly coupled to the fluid source 20. The input nozzle 34 threadably engages a bounding surface 36 of the fluid input 14, and the input nozzle 34 may be a pressure washer nozzle or the like. A first spray nozzle 38 is provided that has a spraying end 40 and coupling end 42. The first spray nozzle 38 threadably engages a bounding surface 44 of the first fluid output 16 has the spraying end 40 being directed upwardly from the spray block 12. The coupling end 42 is positioned within the spray block 12 for receiving the fluid from the input nozzle 34. In this way the spraying end 40 can spray the fluid upwardly from the spray block 12. The first spray nozzle 38 may be oriented to lie on a line that is offset approximately 10.0 degrees from a vertical axis.

A second spray nozzle 45 is provided that has a spraying end 46 and coupling end 47. The second spray nozzle 45 threadably engages a bounding surface 48 of the second fluid output 18 having the spraying end 46 of the second spray nozzle 45 being directed upwardly and forwardly from the spray block 12. Additionally, the coupling end 47 of the second spray nozzle 45 being positioned within the spray block 12 for receiving the fluid from the input nozzle 34. In this way the spraying end 46 of the second spray nozzle 45 can spray the fluid upwardly and forwardly from the spray block 12. The second spray nozzle 45 may lie on a line that is offset approximately 50.0 degrees from the vertical axis. Each of the first 38 and second 40 spray nozzles may be pressure washer nozzles of any conventional design that have an operational pressure ranging between approximately 1500.0 psi and 3000.0 psi An axle 49 is extendable through the axle aperture 33, and the axle 49 may comprise a bolt and a nut or other elongated member. A pair of rollers 50 is each removably coupled to the spray block 12 to roll along a support surface 52, such as ground or the like. The spray block 12 is rolled beneath a vehicle 54 to spray the fluid onto the undercarriage 56 of the vehicle 54. Each of the rollers 50 has the axle 49 extending therethrough such that each of the rollers 50 is positioned adjacent to a respective one of the first 26 and second 28 lateral surfaces of the spray block 12.

In use, the input nozzle 34 is fluidly coupled to the handle of the pressure washer. Thus, each of the first 38 and second 40 pray nozzles receive pressurized water from the pressure washer. Each of the rollers 50 is rolled on the support surface 52 to facilitate the spray block 12 to be rolled beneath the vehicle 54. In this way each of the first 38 and second 40 spray nozzles can spray the fluid onto the undercarriage 56 of the vehicle 54 for washing. Thus, the undercarriage 56 can be washed without requiring a user to climb beneath the vehicle 54 to wash the undercarriage 56.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An undercarriage washing assembly being configured to be rolled beneath a vehicle thereby facilitating a pressure washer to wash the undercarriage of the vehicle without requiring a user to climb beneath the vehicle, said assembly comprising:

a spray block having a fluid input, a first fluid output and a second fluid output, said fluid input being configured to be fluidly coupled to a fluid source, said first fluid output being oriented to lie along a line oriented at an upward angle with respect to said fluid input wherein said first fluid output is configured to spray fluid upwardly from said spray block, said second fluid output being oriented to lie along a line being oriented at an upward angle with respect to said fluid input wherein said second fluid output is configured to spray fluid upwardly from said spray block, said spray block having a rear surface, a top surface, a first lateral surface, a second lateral surface and a front surface, said top surface having a first angled section angling downwardly toward a bottom surface of said spray block, said front surface being oriented at an angle between said top and bottom surfaces;

a pair of rollers, each of said rollers being removably coupled to said spray block wherein each of said rollers is configured to roll along a support surface, said spray block being configured to be rolled beneath the vehicle wherein said spray block is configured to spray the fluid onto the undercarriage of the vehicle;

said fluid input extending through said rear surface toward said front surface;

said first fluid output extending through said first angled section of said top surface and intersects said fluid input such that said first fluid output is in fluid communication with said fluid input;

said second fluid output extending through said front surface and intersects said fluid input such that said second fluid output is in fluid communication with said fluid input; and said spray block having an axle aperture extending through each of said first and second lateral surfaces of said spray block, said axle aperture being positioned closer to said front surface than said rear surface.

2. The assembly according to claim 1, further comprising an input nozzle being removably coupled to said spray block wherein said input nozzle is configured to be fluidly coupled to the fluid source, said input nozzle threadably engaging a bounding surface of said fluid input.

3. The assembly according to claim 1, further comprising a first spray nozzle having a spraying end and coupling end, said coupling end threadably engaging a bounding surface of said first fluid output having said spraying end being directed upwardly from said spray block wherein said spraying end is configured to spray the fluid upwardly from said spray block.

4. The assembly according to claim 3, further comprising a second spray nozzle having a spraying end and coupling end, said coupling end of said second spray nozzle threadably engaging a bounding surface of said second fluid output having said spraying end of said second spray nozzle being directed upwardly and forwardly from said spray block wherein said spraying end of said second spray nozzle is configured to spray the fluid upwardly and forwardly from said spray block.

5. The assembly according to claim 1, further comprising:

an axle being extendable through said axle aperture; and each of said rollers has said axle extending therethrough such that each of said rollers is positioned adjacent to a respective one of said first and second lateral surfaces of said spray block.

6. An undercarriage washing assembly being configured to be rolled beneath a vehicle thereby facilitating a pressure washer to wash the undercarriage of the vehicle without requiring a user to climb beneath the vehicle, said assembly comprising:

a spray block having a fluid input, a first fluid output and a second fluid output, said fluid input being configured to be fluidly coupled to a fluid source, said first fluid output being oriented to lie along a line oriented at an upward angle with respect to said fluid input wherein said first fluid output is configured to spray fluid upwardly from said spray block, said second fluid output being oriented to lie along a line being oriented at an upward angle with respect to said fluid input wherein said second fluid output is configured to spray fluid upwardly from said spray block, said spray block having a rear surface, a top surface, a first lateral surface, a second lateral surface and a front surface, said top surface having a first angled section angling downwardly toward a bottom surface of said spray block, said front surface being oriented at an angle between said top and bottom surfaces, said fluid input extending through said rear surface toward said front surface, said first fluid output extending through said first angled section of said top surface and intersecting said fluid input such that said first fluid output is in fluid communication with said fluid input, said second fluid output extending through said front surface and intersecting said fluid input such that said second fluid output is in fluid communication with said fluid input, said spray block having an axle aperture extending through each of said first and second lateral surfaces of said spray block, said axle aperture being positioned closer to said front surface than said rear surface;

an input nozzle being removably coupled to said spray block wherein said input nozzle is configured to be fluidly coupled to the fluid source, said input nozzle threadably engaging a bounding surface of said fluid input;

a first spray nozzle having a spraying end and coupling end, said coupling end threadably engaging a bounding surface of said first fluid output having said spraying end being directed upwardly from said spray block wherein said spraying end is configured to spray the fluid upwardly from said spray block;

a second spray nozzle having a spraying end and coupling end, said coupling end of said second spray nozzle threadably engaging a bounding surface of said second fluid output having said spraying end of said second spray nozzle being directed upwardly and forwardly from said spray block wherein said spraying end of said second spray nozzle is configured to spray the fluid upwardly and forwardly from said spray block;

an axle being extendable through said axle aperture; and a pair of rollers, each of said rollers being removably coupled to said spray block wherein each of said rollers is configured to roll along a support surface, said spray block being configured to be rolled beneath the vehicle wherein said spray block is configured to spray the fluid onto the undercarriage of the vehicle, each of said rollers having said axle extending therethrough such that each of said rollers is positioned adjacent to a respective one of said first and second lateral surfaces of said spray block.

\* \* \* \* \*